(12) United States Patent
Daniels et al.

(10) Patent No.: US 8,510,943 B2
(45) Date of Patent: Aug. 20, 2013

(54) METHOD FOR REPAIRING A GENERATOR FRAME

(75) Inventors: Jeffrey Michael Daniels, Schenectady, NY (US); Christoph Spitzenpfeil, Rheine (DE); John P. Davis, Duanesburg, NY (US); James Daniel Antalek, Valatie, NY (US); Win Nguyen, Pensacola, FL (US)

(73) Assignee: General Electric Company, Schenectady, NY (US)

( * ) Notice: Subject to any disclaimer, the term of this patent is extended or adjusted under 35 U.S.C. 154(b) by 800 days.

(21) Appl. No.: 12/640,923

(22) Filed: Dec. 17, 2009

(65) Prior Publication Data

US 2010/0139069 A1 Jun. 10, 2010

Related U.S. Application Data

(63) Continuation-in-part of application No. 12/141,953, filed on Jun. 19, 2008, now Pat. No. 8,113,480.

(51) Int. Cl.
*F01D 15/12* (2006.01)

(52) U.S. Cl.
USPC ..................................... 29/889.1; 29/402.01

(58) Field of Classification Search
USPC ......... 29/889, 889.1, 402.03, 402.04, 402.11, 29/402.01, 889.21, 889.3
See application file for complete search history.

(56) References Cited

U.S. PATENT DOCUMENTS

| | | | |
|---|---|---|---|
| 3,752,326 A | 8/1973 | Levingston | |
| 5,744,885 A | 4/1998 | Keck et al. | |
| 6,088,904 A | 7/2000 | Keck et al. | |
| 6,357,549 B1 | 3/2002 | Brennan et al. | |
| 6,505,785 B2 | 1/2003 | Willis et al. | |
| 6,614,125 B2 | 9/2003 | Willis et al. | |
| 6,857,508 B2 | 2/2005 | Miller et al. | |
| 2004/0025466 A1 | 2/2004 | Hink et al. | |
| 2004/0197188 A1 | 10/2004 | Drake | |
| 2007/0200103 A1* | 8/2007 | Viladomiu i Guarro et al. | 254/334 |
| 2009/0224555 A1 | 9/2009 | Zhencai | |

FOREIGN PATENT DOCUMENTS

CN 2075708 U 4/1991

OTHER PUBLICATIONS

Search Report issued in connection with CN Application No. 200910150587.3, Aug. 22, 2012.

* cited by examiner

*Primary Examiner* — David Bryant
*Assistant Examiner* — Christopher Besler
(74) *Attorney, Agent, or Firm* — James McGinniss Esq.; Armstrong Teasdale LLP

(57) ABSTRACT

Methods are provided for repairing a frame configured to support a wind turbine generator. The method includes providing a frame support including a stand, tension member, and jack. The frame support includes a stand coupled to a first portion of the frame. The tension member is coupled to the stand and a second portion of the frame. The jack is configured to move the stand. The jack is actuated to move the stand and increase a tension in the tension member to move the second portion with respect to the first portion. The frame is repaired while the frame support is coupled to the frame. The jack is actuated to move the stand and decrease the tension in the tension member to move the second portion with respect to the first portion. The tension member is decoupled from the second portion. The stand is decoupled form the first portion.

19 Claims, 5 Drawing Sheets

METHOD FOR REPAIRING A GENERATOR FRAME

CROSS-REFERENCE TO RELATED APPLICATIONS

This application is a continuation-in-part of U.S. patent application Ser. No. 12/141,953, filed Jun. 19, 2008, now U.S. Pat. No. 8,113,480 which is hereby incorporated by reference.

BACKGROUND OF THE INVENTION

The subject matter described herein relates generally to wind turbines and, more particularly, to a method for using a frame support to repair a generator frame.

Wind turbines have been receiving increased attention for being environmentally safe and relatively inexpensive alternative energy sources. With the growing interest in alternative energy sources, considerable efforts have been made to develop wind turbines that are reliable and efficient.

Some known wind turbines include a generator frame including a main frame or a "bedplate" and a generator support frame or a "rear frame" portion that is cantilevered from the bedplate. Known generator frames may be subjected to stresses that cause fatigue cracking and/or failure, particularly at the joint between the bedplate and the rear frame portion. Conventional methods for repairing some known generator frames, including replacing at least a portion of known generator frames, requires using a crane to access the bedplate and/or the rear frame portion.

BRIEF SUMMARY OF THE INVENTION

In one aspect, a method is provided for repairing a frame configured to support a wind turbine generator. The method includes coupling a frame support to the frame. The frame is repaired while the frame support is coupled to the frame. When the repair is completed, the frame support is decoupled from the frame.

In another aspect, a method is provided for repairing a frame configured to support a wind turbine generator. The method includes providing a frame support including a stand, a tension member, and a jack. The stand is coupled to a first portion of the frame. The tension member is coupled to the stand and a second portion of the frame. The jack is configured to move the stand. The jack is actuated to move the stand and increase a tension in the tension member to move the second portion with respect to the first portion. The frame is repaired. The jack is actuated to move the stand and decrease the tension in the tension member to move the second portion with respect to the first portion. The tension member is decoupled from the second portion. The stand is decoupled form the first portion.

DETAILED DESCRIPTION OF THE INVENTION

The methods and systems described herein relate to a method for using a frame support to repair a generator frame. The exemplary methods and systems facilitate repairing a wind turbine and, more specifically, facilitate repairing a generator frame uptower without requiring a crane to access and/or support the generator frame.

Figure 1:
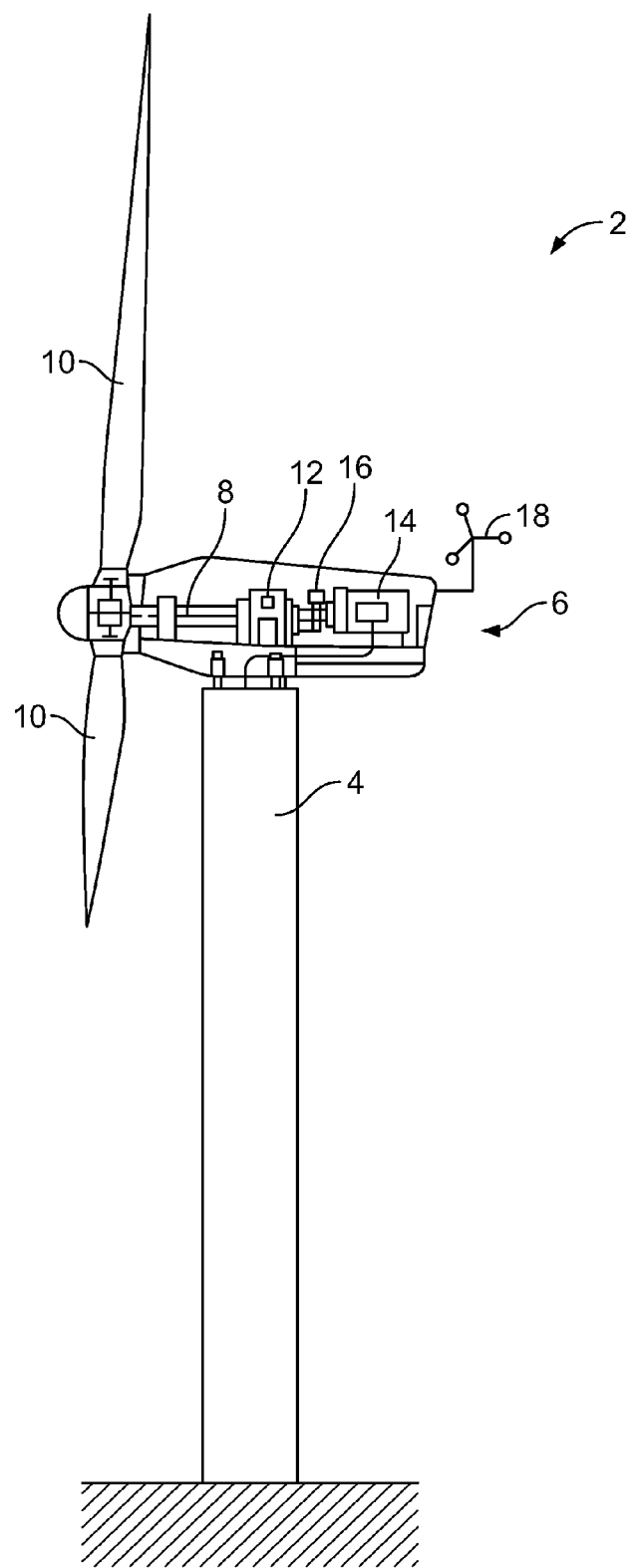
FIG. 1 is a schematic side view of an exemplary wind turbine.

FIG. 1 illustrates a view of an exemplary wind turbine 2. Wind turbine 2 is a wind turbine generator for generating electrical power from wind energy. As used herein, the term "wind turbine generator" is intended to be representative of any wind turbine that generates electrical power from rotational energy generated from wind energy, and more specifically, converts mechanical energy converted from kinetic energy of wind to electrical power.

In the exemplary embodiment, wind turbine 2 includes a tower 4 and a nacelle 6 mounted on tower 4. Tower 4 is fabricated from a suitable material. In the exemplary embodiment, tower 4 is fabricated from tubular steel. Tower 4 has a suitable height that enables wind turbine 2 to function as described herein.

A drive train 8 is enclosed in nacelle 6. A plurality of blades 10 are arranged on a hub to form a rotor (described further below in reference to FIG. 2) at one end of drive train 8 outside of nacelle 6. Blades 10 rotate to drive a gearbox 12 connected to an electrical generator 14 at the other end of drive train 8. Electrical generator 14 generates electrical power from the rotational energy generated by the rotor. Electrical generator 14 is arranged inside nacelle 6 along with a control system 16 that receives input from an anemometer 18.

Control system 16 is communicatively coupled to a plurality of the components of wind turbine 2 for generally monitoring and controlling operation of wind turbine 2 and/or some or all of the components thereof Control system 16 includes one or more microcontrollers that provide control signals to various components within wind turbine 2 to monitor and control, without limitation, pitch and speed regulation, high-speed shaft and yaw brake application, yaw and pump motor application, fault monitoring and/or acoustic emission regulation, for example.

Figure 2:
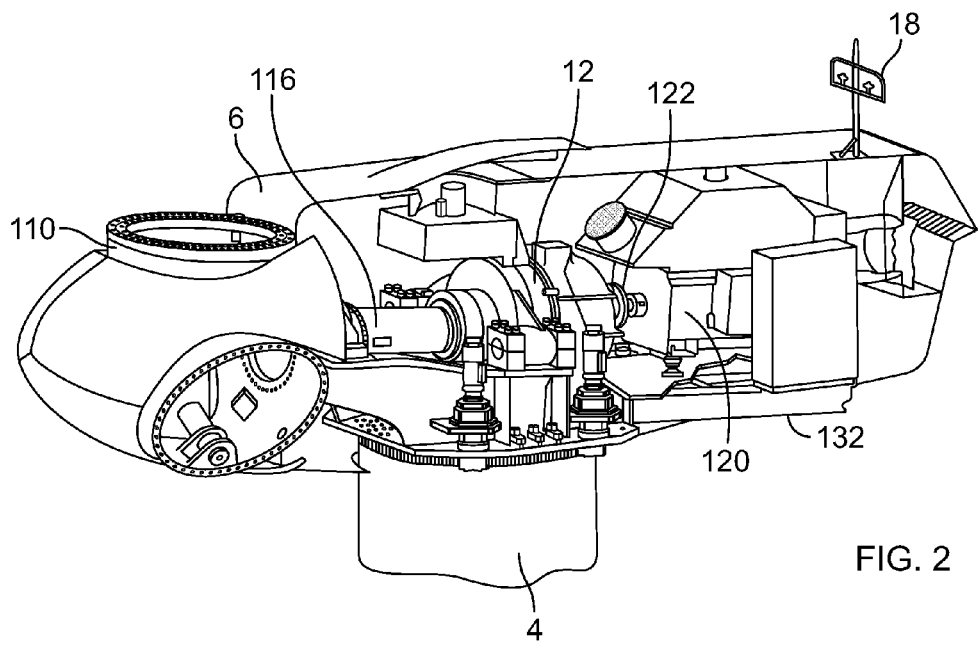
FIG. 2 is a cut-away orthographic view of the nacelle and hub of the wind turbine shown in FIG. 1.

FIG. 2 illustrates a cut-away view of nacelle 6. Drive train 8 of wind turbine 2 (shown in FIG. 1) includes a main rotor shaft 116 connected to a hub 110 and gearbox 12. A high speed shaft (not shown in FIG. 2) is used to drive a first generator 120 via coupling 122. A generator frame 132 provides a framework within nacelle 6 to support various components including electrical generator 14.

Figure 3:
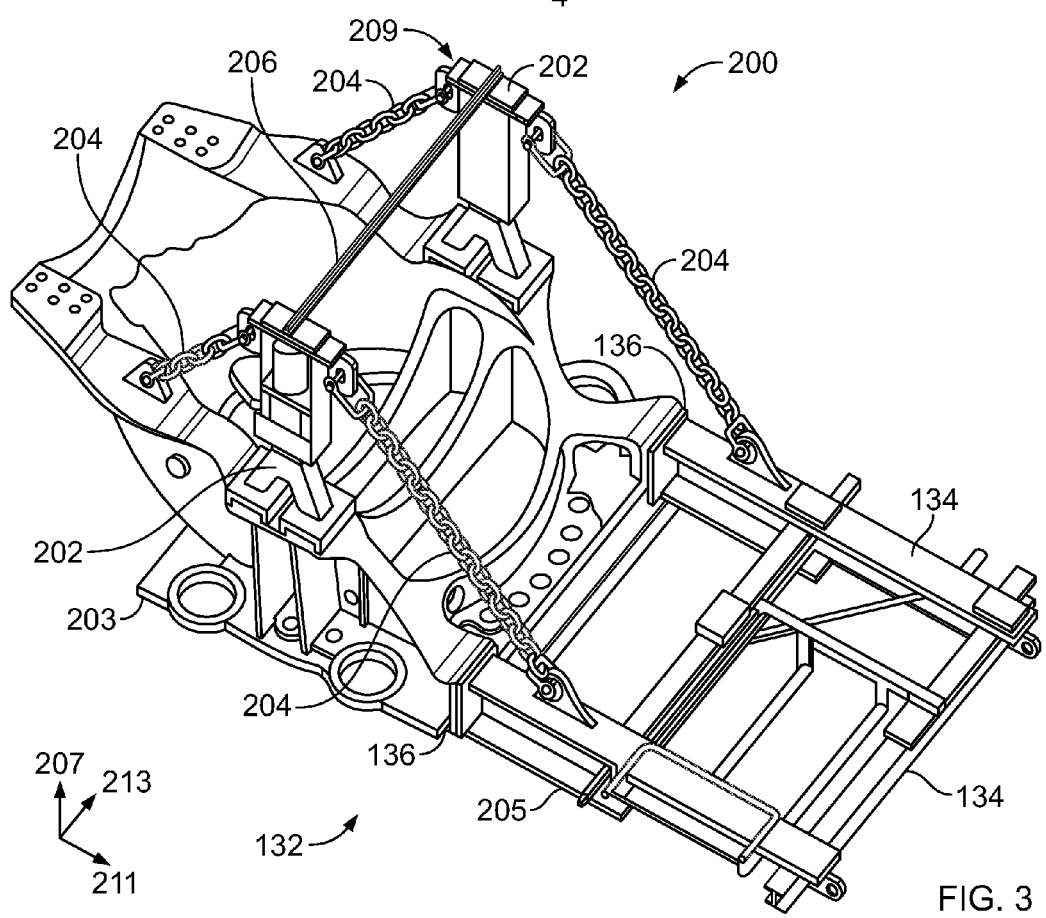
FIG. 3 is an orthographic view of a frame support for the wind turbine shown in FIG. 1.
Figure 4:
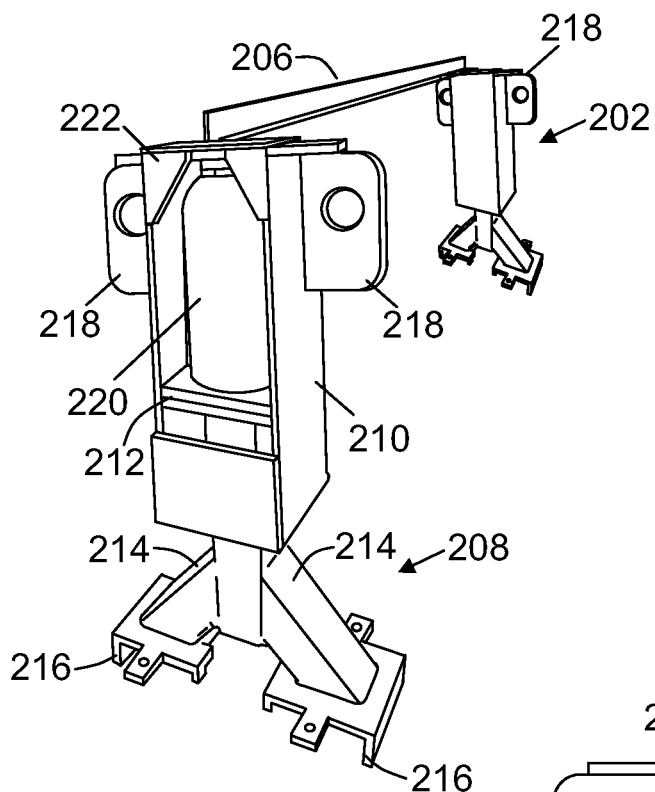
FIG. 4 is an orthographic view of a portion of the frame support shown in FIG. 3.

FIG. 3 illustrates a view of a frame support 200 for a wind turbine 2 including a generator frame 132. FIG. 4 is an orthographic view of frame support 200. Generator frame 132 includes a main frame, or bedplate 203, and a generator support frame, or rear frame portion 205, that is cantilevered from bedplate 203. In the exemplary embodiment, generator frame 132 includes a plurality of beams 134 suitably coupled at joints 136. Alternatively, generator frame 132 may have any suitable frame configuration including a single, contiguous unit or more than two units. Generator frame 132 may, under certain conditions, be subject to high stresses that can cause fatigue cracking and/or failure, particularly at joint 136 between bedplate 203 and rear frame portion 205.

Frame support 200 may be provided in a newly installed construction of generator frame 132 and/or retrofitted into an existing construction of generator frame 132. Frame support 200 includes a suitable number of stands 202 (described further below in reference to FIGS. 4-6). In the exemplary embodiment, frame support 200 includes two stands 202 that extend upwardly from bedplate 203 along a z-axis 207. Alternatively, each stand 202 may extend upwardly from rear frame portion 205 along z-axis 207.

A suitable number of tension members 204 support generator frame 132. In the exemplary embodiment, tension member 204 extends from at least one of a forward side and a rear side of stand 202. More specifically, in the exemplary embodiment, one tension member 204 extends forward from a terminal end portion 209 of stand 202 along an x-axis 211 to couple to bedplate 203, and another tension member 204 extends backward from terminal end portion 209 along x-axis 211 to couple to rear frame portion 205. Alternatively, tension members 204 may be connected directly between bedplate 203 and rear frame portion 205 without stands 202.

Tension members 204 may include, without limitation, chains, ropes, bars, beams, straps, webs, and suitable combinations thereof In the exemplary embodiment, tension members 204 are chains. Alternatively, or in addition, stand 202 may extend downwardly from generator frame 132 with compression members (not shown) connecting downwardly extending stand 202 to rear frame portion 205 and/or bedplate 203.

Stands 202 are coupled to a suitable brace member 206 that provides structural support to stands 202. Alternatively, frame support 200 does not include brace member 206. In the exemplary embodiment, brace member 206 extends along a y-axis 213. In the exemplary embodiment, each stand 202 is coupled to brace member 206 at terminal end portion 209. Additionally or alternatively, a suitable number of tension members 204 may be connected to brace member 206.

Figure 5:
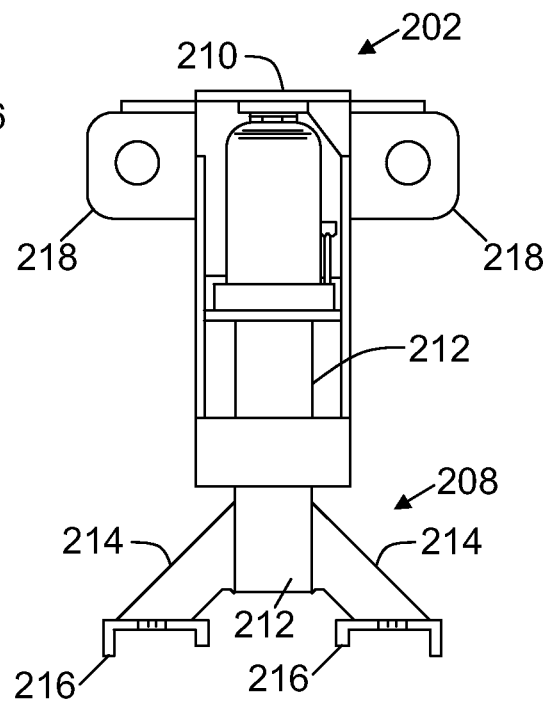
FIG. 5 is a side view of the stand assembly shown in FIGS. 3 and 4.
Figure 6:
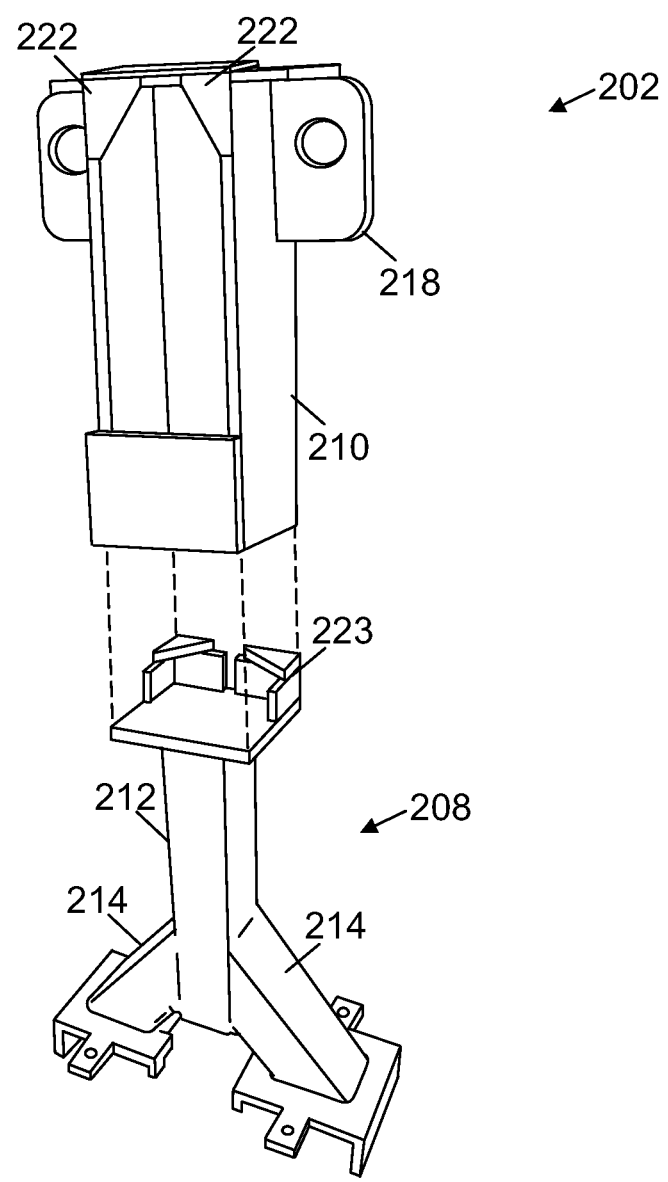
FIG. 6 is an exploded orthographic view of the stand assembly shown in FIG. 5.

FIG. 5 is a side view of stand 202. FIG. 6 is an exploded orthographic view of stand 202. Stand 202 includes a base 208 which is supported by bedplate 203, and a cap 210 movably coupled to base 208 and extendable along z-axis 207 with respect to base 208. In the exemplary embodiment, cap 210 includes an ear 218 on each side for connecting to a corresponding tension member 204. Alternatively, tension member 204 may be connected directly to cap 210.

Base 208 includes a column 212 and a suitable number of legs 214 to support stand 202 on generator frame 132. In the exemplary embodiment, base 208 includes a substantially vertical column 212 and two legs 214. Alternatively, column 212 may be secured and/or formed directly on bedplate 203 and/or rear frame portion 205. In the exemplary embodiment, each leg 214 includes a foot 216 for stabilizing and securing base 208 on generator frame 132.

A suitable tensioning configuration is provided to produce a tension in tension members 204. In the exemplary embodiment, a jack 220 is configured to move stand 202 between an extended position and a retracted position. Alternatively, a ratcheting chain load binder or another suitable device may be provided for producing a tension in tension members 204. In the exemplary embodiment, jack 220 is positioned on top of column 212, and cap 210 slides over column 212 and jack 220. More specifically, in the exemplary embodiment, jack 220 is arranged between a bottom of cap 210 and the top of column 212 for moving cap 210 relative to column 212 and tensioning tension members 204. In the exemplary amendment, the top of cap 210 is provided with flanges 222 for positioning jack 220 on stand 202. Additionally, in the exemplary embodiment, the top of column 212 is provided with flanges 223 for positioning jack 220 on stand 202.

The term "jack" is used herein broadly to refer to any device or mechanism for applying a force between cap 210 and column 212 to move cap 210 with respect to column 212 to produce a tension in tension member 204. For example, jack 220 may include, without limitation, a bottle jack, a screw jack, a spring jack, a hydraulic jack, a pneumatic jack, a mechanical jack, an electrical jack, and/or a ratcheting chain load binder.

Figure 7:
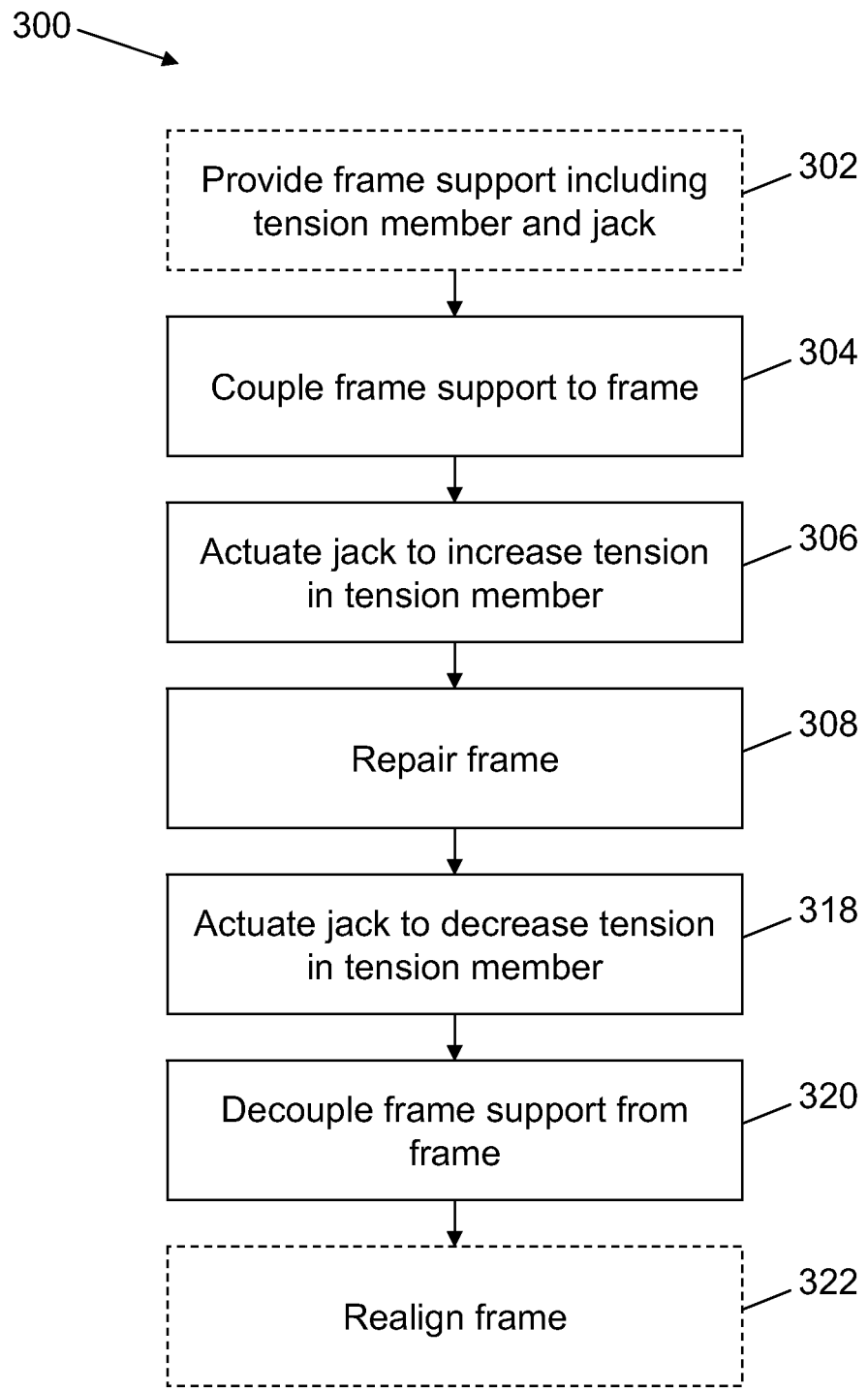
FIG. 7 is a flow chart of an exemplary method for repairing the wind turbine shown in FIG. 1.

FIG. 7 illustrates a flow chart of an exemplary method 300 for repairing wind turbine 2 using frame support 200. More specifically, frame support 200 facilitates repairing nacelle 6 and/or one or more components housed within nacelle 6 such as generator frame 132 uptower and without requiring a crane.

During use, frame support 200 is provided 302 for repairing generator frame 132. Frame support is coupled 304 to generator frame 132. In the exemplary embodiment, when frame support 200 is coupled 304 to generator frame 132, stand 202 is in a retracted position and generator frame 132 is in an initial position. In the exemplary embodiment, foot 216 of stand 202 is coupled 304 to generator frame 132 and, more specifically, bedplate 203 to stabilize and secure base 208 of stand 202 on generator frame 132. Additionally, a first portion of tension member 204 is coupled 304 to a top end of stand 202, more specifically, ear 218. A second portion of tension member 204 is coupled 304 to generator frame 132 using a suitable coupling mechanism. In the exemplary embodiment, tension members 204 are coupled 304 to stand 202 and/or generator frame 132 using a bolted joint connection.

In the exemplary embodiment, jack 220 is actuated 306 to move stand 202 toward the extended position, thereby increasing a tension in tension members 204 to lift and/or suitably support a portion of generator frame 132 with respect to another portion of generator frame 132. Additionally, increasing a tension in tension members 204 reduces a deflection of generator frame 132 and, more specifically, bedplate 203 and/or rear frame portion 205. Supporting generator frame 132 to reduce a deflection of generator frame 132 enables repair and/or replacement of a damaged portion of generator frame 132. For example, supporting generator frame 132 with frame support 200 decreases a tension at or near a damaged joint and enables the frame support 200 to be repaired while maintaining frame support 200 in the initial position.

One or more portions of generator frame 132 are repaired 308 using a suitable method while frame support 200 is coupled to and supports generator frame 132. For example, a weld may be replaced and/or repaired 308 using a suitable method. In the exemplary embodiment, a first portion of generator frame 132 is removed 310 from generator frame 132, leaving a void defined by a second portion of generator frame 132. More specifically, in the exemplary embodiment, the first portion includes at least some damage to generator frame 132, and the second portion defines a void that requires a replacement and/or repaired portion. In the exemplary embodiment, the second portion is prepared 312 for a new weld, which includes, without limitation, cleaning, heating, and/or grinding the second portion. The new weld is then applied 314 to the second portion, filling the void left by the first portion.

After repairing the damaged joint, jack 220 is actuated 318 to move stand 202 toward the retracted position, thereby reducing a tension in tension members 204. Reducing the tension in tension members 204 enables frame support 200 and, more specifically, tension members 204 to be decoupled 320 from stand 202 and/or generator frame 132. In the exemplary embodiment, the initial position of generator frame 132 is generally maintained throughout the repair process. If necessary, generator frame 132 is readjusted and/or realigned 322 to the initial position after frame support 200 is decoupled from generator frame 132.

Although the methods described and/or illustrated herein are described and/or illustrated herein with respect to repairing a wind turbine using a frame support, the methods described and/or illustrated herein are not limited to repairing a wind turbine. Rather, the methods described and/or illustrated are applicable to repairing any suitable apparatus or component.

Exemplary embodiments of the frame support and methods for repairing a wind turbine using the frame support are described above in detail. The methods and systems are not limited to the specific embodiments described herein, but rather, components of the systems may be utilized independently and separately from other components described herein. For example, the methods and systems described herein may have other industrial and/or consumer applications and are not limited to practice with wind turbines as described herein. Rather, one or more embodiments may be implemented and utilized in connection with other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for repairing a frame configured to support a wind turbine generator, said method comprising:
    coupling a frame support to the frame having a first portion and a second portion coupled at an interface;
    coupling a stand, in a retracted position, to the first portion;
    coupling a first tension member to the first portion and to the stand;
    coupling a second tension member to the second portion and to the stand;
    coupling a jack to the stand;
    activating the jack to move the stand from the retracted position to an extended position and to tension the first tension member and the second tension member;
    repairing the frame while the stand is in the extended position; and,
    decoupling the frame support from the frame.

2. A method in accordance with claim 1, further comprising moving the second portion of the frame with respect to the first portion of the frame using the frame support.

3. A method in accordance with claim 1, wherein coupling a frame support further comprises coupling a frame support including a first stand, a second stand, and a brace member, the brace member coupled to the first stand and the second stand to provide support to the first stand and the second stand.

4. A method in accordance with claim 1, wherein coupling a frame support further comprises coupling the frame support including the stand with at least one foot configured to couple to the frame.

5. A method in accordance with claim 1, wherein coupling a frame support further comprises coupling a frame support including a cap, a column, and the jack that is configured to move the cap with respect to the column.

6. A method in accordance with claim 5 further comprising positioning the jack on top of the column and sliding the cap over the column and the jack.

7. A method in accordance with claim 5 further comprising actuating the jack to move the cap with respect to the column.

8. A method in accordance with claim 1, wherein coupling a frame support further comprises:
    increasing the tension in the first tension member and the second tension member of the frame support to move the stand of the frame support toward an extended position; and,
    lifting the first portion of the frame using the frame support.

9. A method in accordance with claim 1, wherein repairing the frame further comprises repairing the frame while the frame is uptower.

10. A method in accordance with claim 1, wherein repairing the frame further comprises:
    removing the first portion of the frame to create a void defined by the second portion of the frame;
    preparing the second portion of the frame; and,
    applying a new weld to the second portion of the frame to fill the void.

11. A method in accordance with claim 10, wherein preparing the second portion of the frame further comprises at least one of cleaning, heating, and grinding the second portion of the frame.

12. A method in accordance with claim 1, wherein decoupling the frame support further comprises:
    reduce the tension in the first tension member and the second tension member of the frame support to move the stand of the frame support toward the retracted position.

13. A method in accordance with claim 1, wherein the jack comprises at least one of a bottle jack, a screw jack, a spring jack, a hydraulic jack and a pneumatic jack.

14. A method for repairing a frame configured to support a wind turbine generator, said method comprising:
    providing a frame support including a stand, a tension member coupled to the stand, and a jack coupled to the stand and configured to move the stand between a retracted position and an extended position;
    coupling the stand to a first portion of the frame;
    coupling the tension member to a second portion of the frame;
    actuating the jack to move the stand from the retracted position to the extended position and increase a tension in the tension member to move the second portion with respect to the first portion;
    repairing the frame;
    actuating the jack to move the stand from the extended position to the retracted position and decrease the tension in the tension member to move the second portion with respect to the first portion;

decoupling the tension member from the second portion; and, decoupling the stand from the first portion.

15. A method in accordance with claim 14, wherein repairing the frame further comprises repairing the frame while the frame is uptower.

16. A method in accordance with claim 14, wherein repairing the frame further comprises:

removing the first portion of the frame to create a void defined by a second portion of the frame;

preparing the second portion of the frame; and, applying a new weld to the second portion of the frame to fill the void.

17. A method in accordance with claim 16, wherein preparing the second portion of the frame further comprises at least one of cleaning, heating, and grinding the second portion of the frame.

18. A method in accordance with claim 14, further comprising adjusting a position of the frame.

19. A method for repairing a frame having a first portion and a second portion coupled at an interface and configured to support a wind turbine generator, said method comprising:

coupling a frame support including a tension member to the frame;

coupling a stand, in a retracted position, to the first portion;

coupling a jack to the stand;

activating the jack to move the stand from the retracted position to an extended position and increasing a tension in the tension member to support the frame;

repairing the frame while the frame support is supported by the tension member;

activating the jack to move the stand from the extended position to retracted position and decreasing the tension in the tension member; and decoupling the frame support from the frame.

* * * * *